Sept. 6, 1960 H. PETERKA 2,951,668

GLASS HOLDING MEANS WITH AN EMBELLISHER

Filed March 19, 1959 2 Sheets-Sheet 1

Inventor
HENRI PETERKA

By Toulmin & Toulmin
Attorneys

Sept. 6, 1960 H. PETERKA 2,951,668

GLASS HOLDING MEANS WITH AN EMBELLISHER

Filed March 19, 1959 2 Sheets-Sheet 2

Inventor
HENRI PETERKA

By Toulmin & Toulmin
Attorneys

United States Patent Office 2,951,668

Patented Sept. 6, 1960

2,951,668

GLASS HOLDING MEANS WITH AN EMBELLISHER

Henri Peterka, 34 Blvd. Richard-Lenoir, Paris, France

Filed Mar. 19, 1959, Ser. No. 800,411

Claims priority, application France Mar. 24, 1958

9 Claims. (Cl. 248—28)

It is known to use, for securing glasses or mirrors to walls, holding means comprising a screw-threaded inner member which receives a head or knob that exerts pressure on the edge of the mirror along which the inner member is disposed, and is fixed to the subjacent wall by a screw or a nail extending through a throughway aperture perpendicular to said wall, said screw or nail being hidden by said head whereas the inner member is surrounded and masked by an embellisher which is advantageously constituted by a sleeve or collar or the like whose height is at least equal to the thickness of the mirror to be held in position. The wall of said collar is cut away in a direction parallel with the axis of the inner member, with which the embellisher is substantially coaxial when in its position of use, the edges of the cut-away part of said wall being adapted to bear against the edge of the mirror. One end of the embellisher bears against said wall adjacent to the mirror and the other end is held in position by the screw-threaded head of the holding means, for example by an arrangement whereby this end is fitted in said head over a part of its length.

An embellisher constructed in the aforementioned manner has, however, the disadvantage of affording an excessively restricted seating especially when it is applied against the straight or curved edge of a mirror; under these conditions it is easily tilted and assumes an inclined position relative to the screw-threaded inner member which it surrounds so that its end no longer correctly fits in the head screwed on to the inner member and thus hinders the screwing.

This disadvantage is of less importance when the mirror holding means fits round the corner of the mirror, since the seating of the embellisher can be greater in this case.

The object of this invention is to avoid the aforementioned disadvantages and to provide various other advantages. The invention provides an embellisher of the aforementioned type which is improved and characterized in that at least one of its ends, adapted to be applied against the surface subjacent to the mirror, at least one of the edges of the cut-out part of its wall which are adapted to bear against the edge of the mirror is extended by a projecting portion which is disposed in such manner as to be engaged under the mirror when said edges are applied against the edge of the mirror. An embellisher so constructed can no longer tilt and assume an inclined position, when mounting the mirror, since it is prevented from so doing by the projecting portion engaged under the mirror and the mounting and screwing of the head is thereby facilitated. It is advantageous to arrange that the height of this protruding portion be by construction equal to the gap it is desired to leave between said subjacent surface and the mirror so that the mirror can rest thereon. In this way there is no longer any need to interpose spacer washers between the subjacent surface and the mirror, since the embellisher performs this function. Thus an element is dispensed with and the mounting of the mirror is facilitated.

In the case of holding means adapted to be used both on a corner and on one of the straight or curved sides of a mirror, there is at least one projecting portion which is engaged under the mirror at each end of the embellisher.

These projecting portions engaged under the mirror could be constituted in various ways. In a particular embodiment, the embellisher has at least one opening having, in a direction parallel with the axis of the embellisher, a height exceeding the maximum current thickness of the mirrors and the lateral wall of the collar constituting the embellisher exists both above and below said opening so that the embellisher extends not only in front of the visible face of the mirror but also behind the back of the mirror, the edge of the opening located behind the mirror constituting the engaged projecting portion. The edge or the corner of the mirror to be fixed in position is therefore engaged in said opening and the whole of the periphery of the end of the collar constituting the embellisher rests on the subjacent surface. It has therefore an excellent seating on this surface.

In the case of holding means adapted to be used both on a corner and along a straight or curved side of a mirror, the lateral face of the embellisher is provided with two openings of different lengths, these openings being preferably in opposed relation to one another.

In all the embodiments described hereinbefore, the screw-threaded inner member is so arranged that its ends must be reversed for use against the edge of the mirror or against a corner of the latter. Thus both ends of the aperture for securing the inner member must be countersunk or cut away to receive the head of the fixing screw, which necessitates an additional machining operation. Further, the positioning of such an inner member requires some attention on the part of the user to avoid any error in respect of the end of the inner member to be applied against the subjacent surface.

In these embodiments, the screw-threaded inner member comprises, extending along a part of its height, a V-shaped longitudinal recess and, along the rest of its height, a part cut away so as to form a flat face, the latter and the V-shaped recess being located on the same side of the axis of the fixing aperture. It is this arrangement which necessitates turning the inner member round for using either the recess or the flat face, according as the inner member is to be applied against the corner or against the edge of the mirror.

The improvement provided by the invention in this respect resides in the fact that the recess and the flat face are provided on opposite sides of the axis of the inner member and at the same end of the latter. This arrangement does not require turning the inner member round and thus simplifies its utilization. Further, this arrangement affords an additional simplification in that the aperture through which the fixing screw extends is countersunk at only one end.

The V-shaped recess and the flat face on the inner member may extend along the whole of the height of the latter, but it would be preferable, in accordance with a further improvement of the invention, to form them on a part of the height of the inner member so that the latter terminates in a circular portion which affords a perfect guiding of the head screwed down on the inner member and facilitates the correct engagement of this head. Further, it is advantageous that the tapped hole in this head be chamfered in such manner that this chamfer, which is suitably inclined, bears against the upper end of the collar constituting the embellisher.

The embellisher of the invention could be composed of any suitable material, such as for example metal or moulded plastic material. The head itself could be composed of plastic material with a central tapped metal liner embedded in the moulding. Not only may the material of the embellisher be different from that of the head, but the colours could also be different even if the materials are the same, as for example in the case of plastic material.

The outer shape of the embellisher is preferably circular, but it could also be polygonal or have any other shape on condition that at least one end of the embellisher be capable of fitting in said head over a certain distance and permit rotation of the latter. The outer shape of the head of the holding means could also be other than circular.

Further features and advantages of the invention will be apparent from the ensuing description of various embodiments of the glass or mirror holding means of the invention, with reference to the accompanying drawings, to which the invention is in no way restricted.

Figure 1:
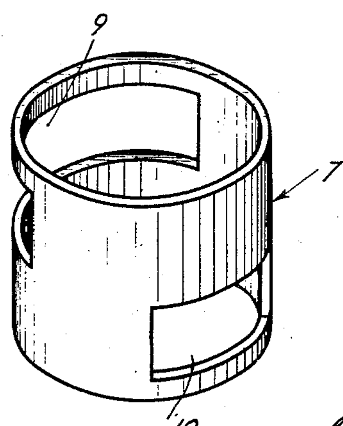
Fig. 1 is a perspective view of one embodiment of the embellisher.
Figure 2:
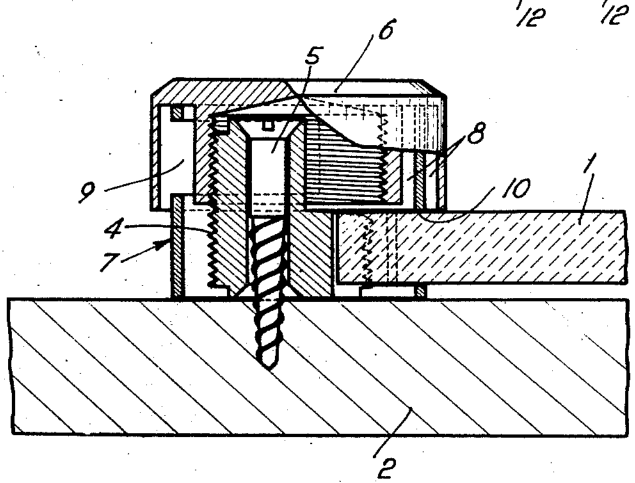
Fig. 2 shows this embellisher in position on the corner of a mirror or glass.

In the embodiment shown in Figs. 1 and 2, the embellisher designated by the reference numeral 7 consists of a ring or collar which, in the presently-described embodiment, is cylindrical. This collar has continuous annular end portions but is provided with two rectangular openings 9 and 10 whose sides which are parallel with the axis of the ring are shorter than the other two sides, the length of these smaller sides or the height of the opening being at least equal to the thickness of the mirrors or glasses for which the embellisher is to be used. The opening 9 is located at a short distance from one of the ends of the collar whereas the opening 10 is in the vicinity of the other end. The distance between the end of the collar and the side of the opening the nearest thereto is equal to the gap desired to be left between the mirror and the subjacent surface. Preferably, as shown, the openings 9 and 10 are located on opposite sides of the axis of the collar, which axis is in the same plane as the axes of the openings; however, any other arrangement is possible. The two openings could be placed one above the other, but this would necessitate a higher collar. Either of the openings 9 and 10 could be used to support a mirror, depending on the spacing desired between the mirror and the surface.

It will be seen from Fig. 2 that when the embellisher is in position, the mirror 1 is engaged in one of the openings 10 of the embellisher and rests against that edge of this opening which is the nearest to the end of the embellisher in contact with the subjacent surface 2. Thus the mirror is held spaced away a short distance from the surface 2 and there is no need to interpose washers or other spacer members between the mirror and the subjacent surface. The other opening of the collar is hidden within the hollow head 6 of the holding means. Further, the end of the embellisher engaged in the recess 8 of the head approximately centers the head 6 relative to the inner member 4 whose screw threads are cut away, and facilitates the screwing of the head on the member 4, particularly on its greatly cut away end. The inner member is secured to the surface 2 by a screw 5.

Figure 3:
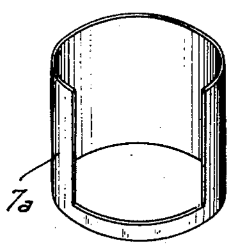
Figs. 3 and 4 are perspective views of other embodiments of the embellisher.

In the embodiment shown in Fig. 3, the collar *7a* constituting the embellisher has only one continuous annular end portion, the height of the latter being equal to the gap required between the mirror and the subjacent wall. Over the rest of the height of the collar, the latter is cut away in a direction parallel with its axis. The annular portion of the collar interconnecting the two longitudinal edges of this cut away part is identical to the continuous annular portion separating one of the openings from the adjacent end of the collar in the embodiment shown in Figs. 1 and 2 and this annular portion is also engaged between the back of the mirror and the subjacent wall. Such an embellisher is, however, of use only along the straight or curved edge of a mirror or glass or on the corner of the latter, but not indifferently along the straight or curved edge and on the corner, like the previously-described embellisher. It is, however, advantageous in that it is cheaper to make.

Figure 4:
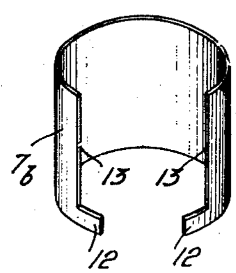

In the simplified embodiment shown in Fig. 4, the embellisher *7b* differs from that shown in Fig. 3 by the fact that it is open throughout its length. At one end it is provided with two lugs 12 which extend from the longitudinal edges 13 of the cut-away part of the collar. These lugs 12, which could circularly extend the wall of the ring, could also be bent outwardly so as to be engaged to a further extent under the mirror. This embodiment of the embellisher in the form of a ring having at least one protruding lug engaged under the mirror, has the double advantage of requiring but few machine operations and results in minimum loss of material and is therefor cheap to make, since it could be stamped out from a flat metal strip and subsequently bent to the required shape.

Figure 5:
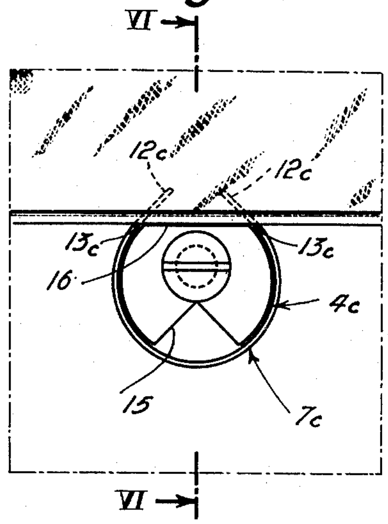
Fig. 5 is an elevational view, in the direction perpendicular to the plane of a mirror or glass fixed on a subjacent support, of holding means and its embellisher, the clamping head having been removed and this holding means being applied against the edge of the mirror.
Figure 6:
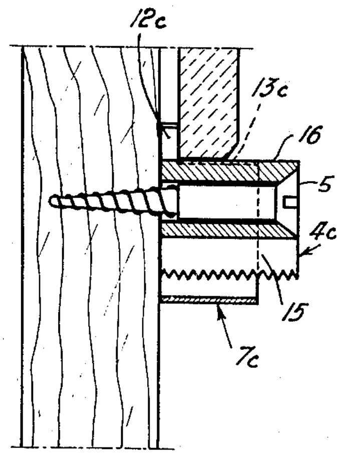
Fig. 6 is a sectional view taken along line VI—VI of Fig. 5.

As shown in Figs. 5 and 6, the screw-threaded inner member *4c* has, as in the previous embodiments, a V-shaped recess 15 adapted to fit on the corner of the mirror and a flat face 16 adapted to be placed against the edge of the mirror, the recess 15 or the face 16 being used according as the holding means is applied against a corner or against an edge of the mirror.

Figure 7:
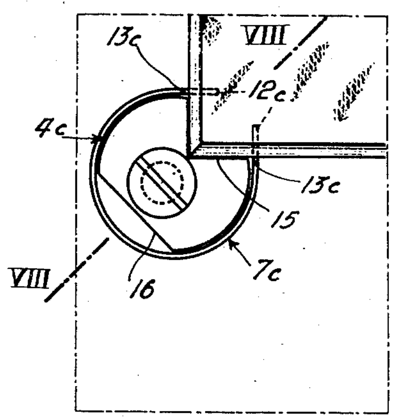
Fig. 7 is a view similar to Fig. 5 of the same holding means applied against the corner of a mirror or glass.

In the presently-described embodiment, the recess 15 and the face 16 are provided on opposite sides of the axis of the throughway aperture of the inner member *4c* provided for the passage of a fixing screw 5. Further, the recess and the flat face extend throughout the length of the inner member. As can be seen from Figs. 5, 7 and 8, irrespective of the position of use of the holding means, whether it be applied against a corner or against an edge of the mirror, it is always the same end of the member *4c* which is applied against the subjacent wall. To pass from one position of use to the other (from Fig. 5 to Figs. 7 and 8) the inner member is turned through 180° about its axis. In this way the aperture for the passage of the fixing screw is countersunk at only one end to receive the head of this screw.

The embellisher *7c* is of the type shown in Fig. 4 and has at only one end two lugs 12c which are engaged under the mirror and project from the longitudinal edges 13c applied against the edge of the mirror. To ensure that the longitudinal edges of the embellisher are well applied against the edge of the mirror irrespective of the position of use, it is well that the longitudinal plane in which the collar is cut away to provide the edges 13c be at a distance from the axis of this collar which is substantially equal to the distance between the axis of the inner member 4c and the plane on which the latter is cut away to form the face 16 and substantially equal to the distance between this axis and the plane intersecting the peripheral corners of the V-shaped recess 15.

Figure 8:
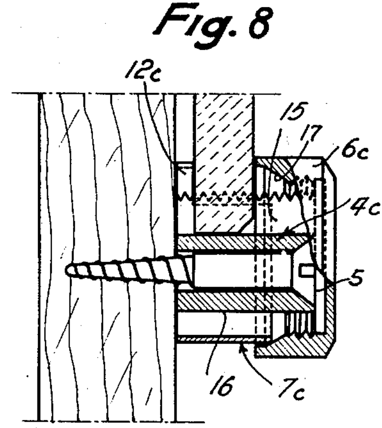
Fig. 8 is a sectional view taken along line VIII—VIII of Fig. 7 through the axis of the inner member, the clamping head being in position on the latter.

Further, as shown in Fig. 8, a chamfer 17 is formed at the end of the tapped hole by which the clamping head 6c is screwed on the inner member 4c.

This chamfer 17 has such size that it bears against the end of the embellisher remote from that applied against the subjacent wall. In this way, the embellisher is always well held in position and correctly centered relative to the inner member without possibility of moving transversely of the latter. Further, the head 6c always bears against the mirror even if the latter has slight variations in its thickness, since the head 6c is free to move somewhat axially relative to the embellisher by pinching the latter to a varying extent. The elastic action of the embellisher, which is therefore more or less pinched by the head 6c, hinders rotation of the latter and prevents it from accidentally unscrewing.

Figure 9:
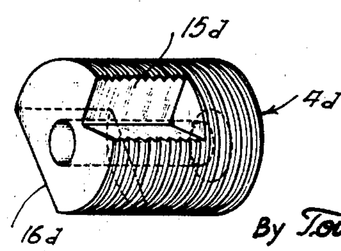
Fig. 9 is a perspective view of a modification of the screw-threaded inner member.

In the modification of the screw-threaded inner member 4d shown in Fig. 9 the V-shaped recess 15d and the face 16d extend along only a part of the height of the member from the same end of the latter, namely the end adapted to be applied against the subjacent surface. Thus the inner member 4d has a circular portion at its other end which facilitates the engagement of the head thereon.

It should be understood that the scope of the invention encompasses an embellisher consisting of a collar which has been cut away longitudinally over a part of its height starting from only one end; such an embellisher is however only of use either for a corner glass holding means or for holding means for the side of the glass, depending on the distance between the parallel edges of the aperture formed by thus longitudinally cutting away a part of this collar. In this case, the collar could, moreover, be cut away longitudinally over the whole of its height.

Although specific embodiments of the invention have been described, many modifications and changes may be made therein without departing from the scope of the invention as defined in the appended claims.

What I claim is:

1. Means for holding glasses securely applied on walls and comprising a securing stud-like member pierced throughout with a hole adapted to accommodate a fastener of the type including nails and screws and long enough to project from one end of said securing member to be capable of penetrating into a wall and thereby hold said member applied on said wall, said securing member further having an outer screw thread the axis of which is substantially parallel to said hole, an internally screw-threaded cap adapted to be screwed down on said externally screw threaded securing member so as to be capable of exerting pressure on a glass edge of a glass applied on said wall adjacent said securing member, and an embellisher constituted by a sleeve adapted to be inserted endwise between said wall and said cap so as at least partly to encircle and substantially hide said securing member and be held in place by said cap and having a cut-away part the longitudinal edges of which are substantially parallel with the sleeve axis and intended to face said glass edge so as to allow the latter to be located close to said securing member, such said sleeve which comprises adjacent at least one of its ends at least one part projecting beyond said edges of said cut-away part and thereby adapted to be engaged under said glass when the edges of said cut-away part substantially engage said glass edge, and thus to serve as spacing member between the wall and the glass.

2. Means as claimed in claim 1, wherein said cut-away part comprises, in a direction parallel with its axis, a height exceeding the thickness of the glasses, the sleeve wall still being present above and below said cut-away part so that the sleeve wall will encircle said securing member not only in front of the visible face of the glass but also behind the back of the latter, said sleeve wall portion behind the glass constituting said spacing member.

3. Means as claimed in claim 2, with said sleeve being provided with a second cut-away part with both of said cut-away parts having different widths.

4. Means as claimed in claim 3, said two cut-away parts being oppositely located.

5. Means as claimed in claim 4, said two cut-away parts being located on one and the other side of the transverse median plane of the sleeve.

6. Glass holding means as claimed in claim 1, wherein said securing member comprises a longitudinal V-shaped recess and a cut-away part providing a flat face, said recess and said flat face being located on opposite sides of the axis of said securing member and extending both from the same securing member end along a part of its length only so that the other end is a wholly circular one.

7. Glass holding means as claimed in claim 6, wherein said hole through the securing member for the passage of a fastener is countersunk at only one end.

8. Glass holding means as claimed in claim 6, wherein the distance between the axis of said sleeve and the plane containing the edges of its cut-away part is substantially equal to the distance between the axis of said securing member and its said flat face and substantially equal too to the distance between said axis and the plane containing the V-edges of said V-shaped recess.

9. Glass holding means as claimed in claim 1, wherein said screw-threaded cap has its embellisher engaging end portion chamfered thereby resiliently to restrain the engaged embellisher end which in turn resiliently locks said screw-threaded cap.

References Cited in the file of this patent

UNITED STATES PATENTS

| | | |
|---|---|---|
| 549,337 | Stagg | Nov. 5, 1895 |
| 2,244,977 | Hansman et al. | June 10, 1951 |
| 2,771,259 | Laystrom | Nov. 20, 1956 |

FOREIGN PATENTS

| | | |
|---|---|---|
| 849,202 | Germany | Sept. 11, 1952 |